United States Patent [19]

Chaplain

[11]  4,365,948

[45]  Dec. 28, 1982

[54] APPARATUS FOR THE CONTINUOUS MANUFACTURE OF FINNED TUBULAR SECTIONS MADE OF SYNTHETIC MATERIAL, AND FINNED TUBULAR SECTIONS

[75] Inventor: Jacques Chaplain, Sevres, France

[73] Assignee: Armosig S.A., La Celle Saint Cloud, France

[21] Appl. No.: 30,430

[22] Filed: Apr. 16, 1979

[30] Foreign Application Priority Data

Apr. 24, 1978 [FR] France .................. 78 12033

[51] Int. Cl.³ ............................................. B29D 23/18
[52] U.S. Cl. ................................. 425/417; 138/121; 138/173; 264/508; 264/DIG. 52; 425/336; 425/380; 425/461
[58] Field of Search ............... 425/380, 461, 417, 336; 264/508, DIG. 52; 138/121, 173

[56]  References Cited

U.S. PATENT DOCUMENTS 3,043,612  7/1962  Pavlik ................................ 138/121
3,731,711  5/1973  Bauer ................................ 138/121
3,993,060  11/1976  Mitchell ........................... 138/121

FOREIGN PATENT DOCUMENTS 2237107  7/1975  France .

Primary Examiner—Paul R. Michl
Attorney, Agent, or Firm—Charles E. Brown

[57]  ABSTRACT

Apparatus for continuous extrusion of tubular sections of thermoplastic material having a smooth inner surface and an annularly finned outer surface defined by alternating ribs and grooves. The apparatus comprises a die assembly made up of an outer die part and an inner die plunger. Two sets of chills define in combination a casting cavity having alternating grooves and ribs both having circular cross sections. The radius of the cross section of the grooves is smaller than that of the ribs, preferably the radius of the ribs ranges between 1.25–1.35 times greater than the radius of the grooves. For their displacement along closed loop paths the chills are provided with racks and their back sides are in meshing engagement with gears. A smoothing mandrel is provided in line with the die plunger and is cooled by a cooling fluid.

12 Claims, 6 Drawing Figures

APPARATUS FOR THE CONTINUOUS MANUFACTURE OF FINNED TUBULAR SECTIONS MADE OF SYNTHETIC MATERIAL, AND FINNED TUBULAR SECTIONS

FIELD OF THE INVENTION

The present invention generally relates to the manufacture, in extrudable synthetic material, of tubular sections, or tubes, of the type currently used for the circulation of various fluids, and particularly of waste water.

BACKGROUND OF THE INVENTION

In their most simple form, the inner and outer urfaces of these tubes are smooth, and they may easily be continuously manufactured by extrusion with the aid of a tubular die assembly, i.e. a die assembly formed by an outer die and an inner punch; it then suffices to ensure at one of the ends of sections of such tubes the swell adapted to allow their successive fitting.

In practice, it is usual to place the tubes of this type directly in the ground, this resulting in their undergoing transverse external forces from the latter which firstly tend to ovalise the section thereof and then, if these forces become sufficiently great, to provoke a buckling of this section then a sharp, local subsidence thereof.

To overcome this drawback, it has already been proposed to increase the moment of inertia per unit of length of these tubes by giving a finned profile longitudinally with respect to their outer surface.

French patent application No. 73 24218 (published under No. 2 237 107) describes an apparatus for continuously manufacturing, by extrusion, a tubular section made of synthetic material having a smooth inner surface and an outer surface provided with roughness of any configuration, for example annular fins as illustrated in FIG. 4.

This apparatus comprises a tubular extrusion die assembly formed by an outer die and an inner punch, in combination with, on the one hand, two sets of chills each presenting a casting impression provided transversely with grooves of circular transverse section alternating with ribs, likewise of circular section, thus forming the desired fins, and, for each of said sets of chills, conveyor means for a continuous circulation thereof along a closed loop path comprising, in particular, a rectilinear forward branch, which extends parallel to the axis of the die assembly, on either side of the outlet thereof, on one side of this axis for one of said sets of chills and on the other side of this axis for the other set, and in the course of which, from one of said sets to the other, the chills are paired so as jointly to form successive casting rings and, on the other hand, in line with the punch of the die assembly, a smoothing mandrel, said smoothing mandrel and said chills jointly defining the casting cavity for forming the desired tubular section.

As results from FIG. 4 of the above-mentioned French patent application, the ribs of the chills of this apparatus, which alternate with grooves, have, like the latter, an overall circular transverse section, such a section extending in both cases over a semi-circonference.

To all appearances, the radius of the transverse section of such a groove is equal to that of the transverse section of a rib.

SUMMARY OF THE INVENTION

The present invention is based on the observation, confirmed by calculation and practical tests, that it is particularly advantageous, for the tubular section obtained, if the radius of the transverse section of a groove of a chill is smaller than that of the transverse section of a rib.

It is therefore a first object of the present invention to provide an apparatus for continuously manufacturing tubular sections made of extrudable thermoplastics material, having a smooth inner surface and an outer surface provided with annular fins, of the type comprising a tubular extrusion die assembly formed by an outer die and an inner punch, in combination on the one hand with two sets of chills each presenting a casting impression provided transversely with grooves of circular transverse section alternating with ribs likewise of circular section, thus forming the desired fins, and, for each of said sets of chills, conveyor means for a continuous circulation of said chills in a closed loop path comprising in particular a rectilinear forward branch, which extends parallel to the axis of the die assembly, on either side of the outlet thereof, on one side of said axis for one of said sets of chills and on the other side of said axis for the other, and in the course of which, from one of said sets to the other, the chills are paired so as jointly to form successive casting rings, and, on the other hand, in line with the punch of the die assembly, a smoothing mandrel, said smoothing mandrel and said chills jointly defining the casting cavity for the formation of the desired tubular section, and characterized in that the radius of a groove of a chill is smaller than that of a rib thereof.

In practice, as the chills used thus present alternating grooves and ribs, a periodic variation is produced of the casting volume to be filled at each instant by the extruded material.

It is possible, at least for certain applications, to be satisfied with the periodic fluctuations of flow thus imposed on the extruder supplying the extrusion die assembly.

However, for other applications, these fluctuations in flow may be the origin of operational disturbances upstream, which are sometimes difficult to master and control.

This is why, in accordance with a feature of the invention, it is proposed in this case to control the conveyor means associated with the chills so that they ensure therefor, along the rectilinear forward branch of their path, an advance speed modulated about an average speed which corresponds to a constant rate of flow of the extrusion die assembly, and which, for example, is controlled, in manner known per se, by a speed regulator sensitive to the rate of flow of this die assembly.

In this case, there is at any moment an adequation between the casting volume to be filled and the rate of flow of the extrusion die, this eliminating any risk of operational disturbances upstream.

In addition, with this arrangement, the possible difficulties in correctly filling the casting cavity with a synthetic material having in the plastic state only a low viscosity, are set aside, this avoiding, in the finished product, any presence of inner stress that may be prejudicial to the correct use thereof.

As the case may be, the presence of ribs on a chill which are of appreciable axial extension, results in the formation, for the corresponding casting cavity, of zones of reduced volume, in which the extruded matter is rolled and, by contrast, this matter is expanded in the zones of greater volume of this casting cavity which, alternating with the preceding ones, correspond to the grooves of the chills.

In a rolling zone, the molecular chains constituting the extruded material are the object of a preferred orientation along the longitudinal axis of the tubular section obtained, favourable to a good resistance in this direction of said section.

In the expansion zones, which alternate with the preceding ones, these molecular chains are the object of a transverse straightening favourable to a good transverse ultimate compressive crushing strength of the tubular section obtained.

Whatever the case may be, due to the particular section of the annular fins that it comprises on its periphery, a tubular section obtained according to the invention advantageously presents, with respect to a tubular section of the prior art having the same weight per meter, of the type for example such as the one shown in FIG. 4 of the above-mentioned French patent application, superior mechanical characteristics or, with equal mechanical characteristics, its weight per meter is advantageously lower.

Due to the interest presented by such a section, a further object of the present invention is to provide a tubular section with smooth inner surface and outer surface provided with annular fins alternating with grooves, this tubular section being characterized in that, obtained for eample with the aid of an apparatus of the type succinctly described hereinabove, its fins have a circular transverse section, the grooves with which said fins alternate also have a circular transverse section, and the radius of the transverse section of said fins is smaller than that of the transverse section of said grooves.

According to a feature of the invention, this section may be further lightened, with equal mechanical characteristics, by associating with the extrusion process, a process of expansion by inner chemical bubbling, known per se, either, for constant speeds of the chills vis-a-vis the extrusion die assembly, a slight expansion being obtained in the zones of small thickness of the desired tubular section, due to the rolling in these zones, and jointly an expansion greater than the preceding one being obtained in the zones of greater thickness of this section, due to the expansion in these zones, or, on the contrary, by a suitable modulation of this speed, of the type suggested hereinabove, a regular bubbling being sought along the whole of the section.

The invention will be more readily understood on reading the following description with reference to the accompanying drawings.

DETAILED DESCRIPTION OF THE PREFERRED EMBODIMENTS

Referring now to the drawings, the apparatus according to the invention comprises, in manner known per se, a tubular extrusion die assembly 10, formed by an outer die 11 and an inner punch 12 disposed axially in this die so as to form therewith an annular volume 13 for the passage of the extruded material which it is to shape, and, to this end, it is supplied by an extruder 14.

These arrangements are well known per se and will not be described in greater detail here.

Figure 3:
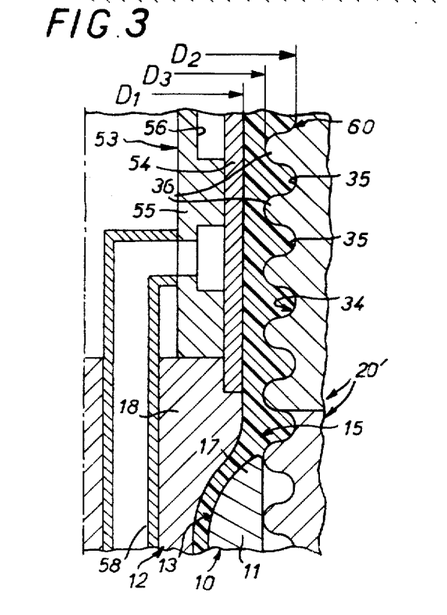
FIG. 3 shows on a larger scale a detail of FIG. 1 marked by inset III in this FIG. 1.

At the outlet 15 of the die assembly 10, the lips 17, 18 thereof, formed respectively by its outer die 11 and its inner punch 12, FIG. 3, flare outwardly.

Figure 1:
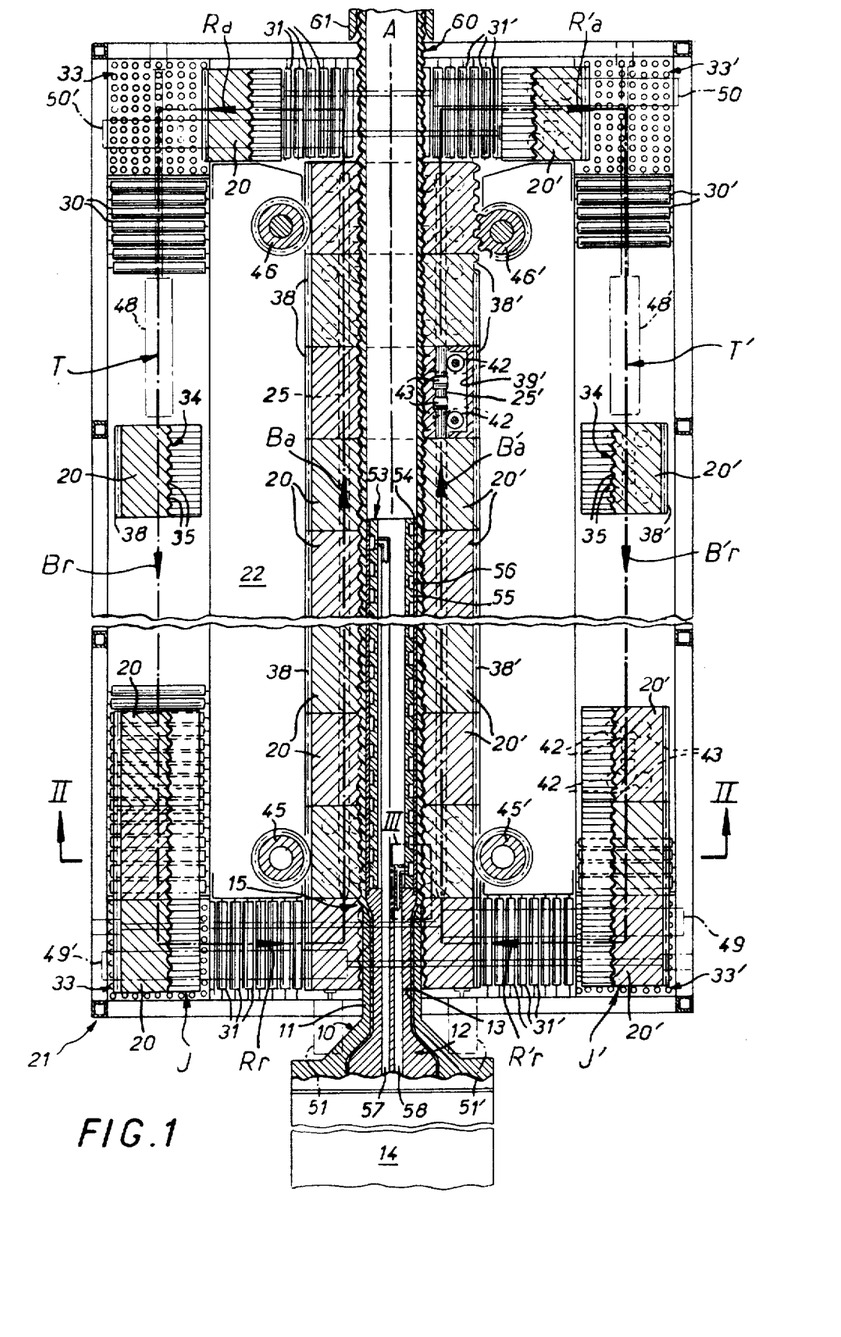
FIG. 1 is a view in axial section of an apparatus according to the invention, along line I—I of FIG. 2.

In order to carry out the invention, two similar sets J, J' of chills 20, 20' are associated with this extrusion die assembly 10, and, for each of these sets J, J' of chills, conveyor means are provided for ensuring a continuous circulation thereof along a closed loop path shown schematically by a broken line T, T' of FIG. 1 and comprising in particular a rectilinear forward branch Ba, B'a which extends parallel to axis A of the die assembly 10, on either side of the opening 15 thereof, on one side of said axis for set J and on the other side thereof for set J'.

In the embodiment shown, the paths T, T' are made in the same horizontal plane, symmetrically on either side of a vertical plane passing through the axis A of the die assembly 10.

For supporting the chills 20, 20', the apparatus according to the invention comprises a frame, generally designated 21 in the Figures.

This frame 21 will not be described in great detail here.

It will suffice to specify that it comprises, half-way up, a sole plate 22.

Parallel to the axis A of the die assembly 10, the frame 21 is provided with a fixed guide 23 for defining the rectilinear forward branch Ba, B'a of the path T, T' of the chills 20, 20'.

In the embodiment shown, said guide comprises a floor 24 carried by the soleplate 22 and provided, projecting on either side of the vertical plane passing through the axis A of die assembly 10, with two parallel rectilinear rails 25, 25' and a ceiling 27 provided with two similar projecting rails 28, 28' corresponding to the preceding rails 25, 25'.

On either side of the guide 23, which occupies a central position, and parallel to this guide, the soleplate 22 carries for definition of the return branch Br, B'r of the path T, T' of the chills 20, 20', in the embodiment shown, two alignments of rollers 30, 30' adapted to support these chills.

The return branches Br, B'r of the paths T, T' are therefore, in this case, likewise rectilinear.

The same applies, in the embodiment shown, to the connecting portions Ra, R'a and Rr, R'r connecting these branches together.

In the embodiment shown, these connecting portions are, in addition, perpendicular to the rectilinear branches that they connect, and they are defined by alignments of rollers 31, 31' adapted to carry the chills 20, 20'.

At the junction of the alignments of rollers 30, 30' on the one hand and 31, 31' on the other hand, in the corresponding angle zones, plates 33 33' with balls are disposed, adapted to serve as direction change plates for the chills 20, 20'.

These chills each form an overall semi-cylindrical block with substantially parallelepipedic outer volume.

They are paired in two's from one set J, J' to the other, i.e. two homologous chills 20, 20' of these sets are adapted to form jointly, about the axis A of the die assembly 10, a casting ring, closing each other before the opening 15 of said die assembly.

Their front face, the one adapted to be directed towards the axis A of the die assembly 10, parallel to this axis, and therefore to form a casting impression 34, is semi-cylindrical and is provided with grooves 35 adapted to form roughness.

In the embodiment shown, being a question of the formation of roughness in the form of annular fins, the grooves 35 of the casting impression 34 of a chill 20, 20' extend transversely with respect to the axis A of the die assembly 10 and therefore transversely with respect to such a chill.

These grooves 35 are of circular transverse section, and they alternate with ribs 36 which are also of circular transverse section; in practice, in the embodiment shown, each of these transverse sections extends over a semicircumference, but it is not necessarily so.

Figure 4:
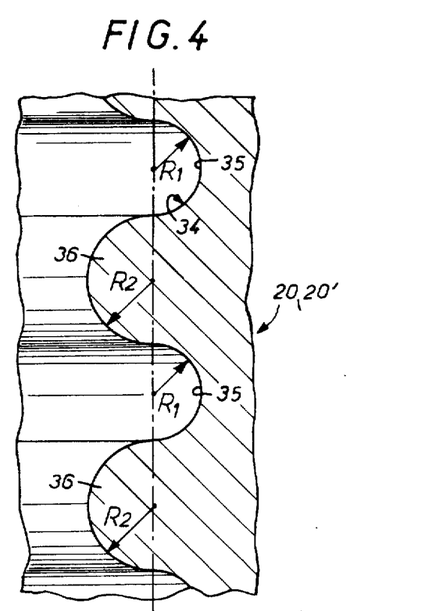
FIG. 4 is, on a still larger scale, a partial view in axial of a chill.

According to the invention, and as may be more easily seen in FIG. 4, the radius $R_1$ of the transverse section of a groove 35 is smaller than that $R_2$ of the transverse section of a rib 36.

On their dorsal face, the one adapted to be opposite the axis A of the die assembly 10, the chills 20, 20' each bear a rack 38, 38'.

The chills 20, 20' all being similar, their racks 38, 38' are in two's in line with one another, for each set J, J' of chills, in the rectilinear branches Ba, B'a of the corresponding paths T, T'.

Figure 2:
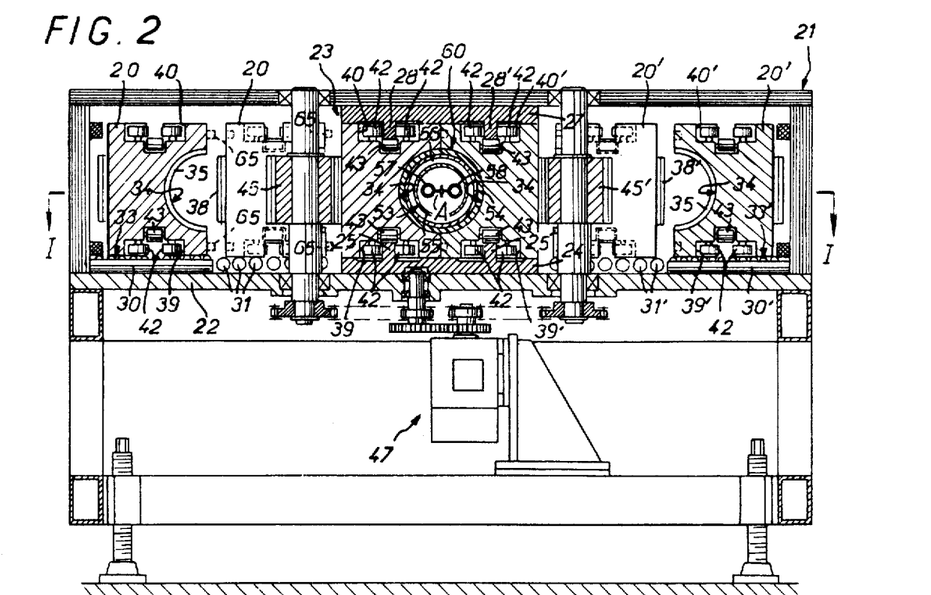
FIG. 2 is a view in transverse section of this apparatus, along the line II—II of FIG. 1.

For their engagement on the rails 25, 25' of the fixed guide 23, the chills 20, 20' each comprise, longitudinally, on their lower face, a groove 39, 39' (FIG. 2).

Similarly, for their engagement on the rails 28, 28' of this fixed guide 23, they each comprise, longitudinally, on their upper face, a groove 40, 40'.

In the embodiment shown, rolling means are interposed between each chill 20, 20' and any one of the rails 25, 25', 28, 28'; for each chill, it is question of rollers 42 adapted to cooperate with the sides of the rails 25, 25' and 28, 28', and rollers 43 adapted to cooperate with the edge of these rails; these rollers are mounted to rotate on the chills 20, 20'.

For the rectilinear branch Ba, B'a of the paths T, T', the conveyer means associated with the chills 20, 20' comprise, in association with the fixed guide 23, a drive gear 45, 45' disposed at the inlet of this fixed guide, on the assembly 10 side, and a brake gear 46, 46' disposed at the outlet of the fixed guide 23.

These gears 45, 45' and 46, 46' are adapted to mesh with the racks 38, 38' of the chills.

By suitable transmission means, for example with pinions and chains, the drive gears 45, 45' are jointly coupled in rotation with controlled rotating means 47.

The same may apply to the brake gears 46, 46'.

However, as a variant, the latter may be coupled in rotation with a brake.

Whatever the case may be, the arrangements are such that the brake gears 46, 46' tend to rotate at a speed slower than that of the drive gears 45, 45', with the result that, along the rectilinear branch Ba, B'a of the paths T, T', the chills 20, 20' present on this rectilinear branch are successively maintained in contact with one another.

In association with the rollers 30, 30', the conveyer means associated with the chills 20, 20' along the rectilinear branches Br, B'r of their pats T, T' comprise, in the embodiment shown, jacks 48, 48'; such jacks have only been shown schematically in broken lines in FIG. 1 and, in the present case, they are jacks acting by traction.

Similarly, jacks 49, 49' acting by traction, and jacks 50, 50' acting by thrust, are associated with the chills 20, 20' for the rectilinear sections Rr, R'r and Ra, R'a of their path T, T'.

Finally, jacks 51, 51', acting by thrust, are further associated with the chills 20, 20' at the inlet of the fixed guide 23, for introduction thereof in this fixed guide.

Furthermore, a smoothing mandrel 53 extends in line with the punch 12 of the die assembly 10, in continuity with this punch.

Over at least part of its length, this smoothing mandrel 53 is cooled and, to this end, it comprises channels for the internal circulation of a cooling fluid.

In the embodiment shown, the smoothing mandrel 53 comprises a smooth outer sleeve 54 sheathing an inner tube 55 on the periphery of which is formed a helical groove 56 belonging to the channels for the circulation of a cooling fluid; at its end which is axially most remote from the die assembly 10, this groove 56 is in connection with a tube 57 for supplying it with cooling fluid and at its end axially closest to the die assembly 10, it is in connection with a tube 58 for evacuating this cooling fluid.

In the embodiment shown in FIGS. 1 to 3, these pipes 57, 58 extend parallel to each other, in the axis of the punch 12 of the die assembly 10, and, according to modalities known per se, they are connected to means suitable for applying, circulating and cooling the fluid that they convey.

To this end, a square head or offset head may be used for example, or the tubes 57, 58 may be made to pass through the crosspieces usually carrying the punch 12, for connection of these tubes to peripheral exchangers, the pressures and flow being obtained conventionally by circulation pump and set of valves.

From the foregoing, the chills 20, 20' suitably paired in two's from one of sets J, J' to the other, jointly form, in operation, around the smoothing mandrel 53, successive casting rings defining with this smoothing mandrel a casting cavity, at right angles to the outlet 15 of the die assembly 10.

This casting cavity, which is annular, has an overall cylindrical inner surface, of diameter D1 defined by the outer diameter of the smoothing mandrel 53 and a ringed outer surface between two diameters F2, D3, the first defined by the bottom of the grooves 35 of the chills 20, 20', and the second by the crest of the ribs 36 of these chills (FIG. 3).

In the definition of this casting cavity, the chills 20, 20' successively and continuously replace one another, these chills being continuously moved away from the die assembly 10 by the conveyer means which are associated therewith, as explained hereinabove.

The lips 17, 18 of the die assembly 10, which flare outwardly, are directed towards the chills 20, 20', with the result that a suitable filling of the corresponding casting cavity is ensured as the synthetic material in question is extruded.

For the zones of smaller radial dimension of the casting cavity, at right angles to the ribs 36 of the chills 20, 20'n this synthetic material is rolled parallel to the axis of the die assembly 10; for the zones of larger radial dimension of the moulding cavity, at right angles to the grooves 35 of the chills 20, 20', it is, on the contrary, expanded.

In all cases, the speed V imposed on the chills 20, 20' by the pinions 45, 45' and 46, 46' along the rectilinear branch Ba, B'a of their path T, T' is chosen such that, in connection with the flow of the extruder 14, and in view of the nature of the synthetic material used, there is a suitable filling of the casting cavity.

According to a feature of the invention and to take into account the periodic fluctuations of the volume of the cavity due to the alternance of the grooves 35 and rigs 36, the speed of advance V of the chills 20, 20' along the rectilinear branch Ba, B'a of their path T, T' is modulated about an average speed Vm corresponding to a constant rate of flow for the extruder 14.

In other words, this advance speed V is greater than the average speed Vm when it is a groove 35 of the chills 20, 20' in question which is at right angles to the opening 15 of the die assembly 10, and lower than this speed Vm when, on the contrary, it is a rib 36 of the chills 20, 20' which is at right angles to this opening.

Figure 5:
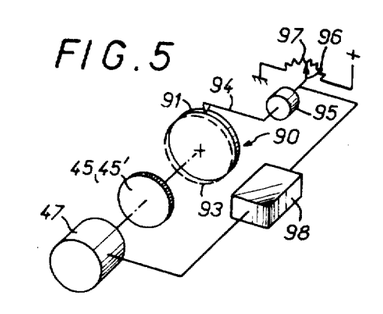
FIG. 5 is a block diagram illustrating a servocontrol of the apparatus according to the invention.

For example, and as illustrated in the block diagram of FIG. 5, a rotating cam 90 is used, of which the contour 91 corresponds to a step, in the form of a wave, of the impression 34 of a chill 20, 20', this step being formed by the transverse section of a groove 35 and the transverse section of a rib 36.

Thus, with respect to a circle 93 shown in mixed lines and representing an average reference thickness for the desired section, the contour 91 has a radially projecting part, corresponding to the rib of the step in question and a radially recessed part corresponding to the groove of this step.

Of course, the variations in depth between these two parts of the contour 91 of the cam 90 may be different from those actually existing between a groove and a rib of a chill, but the corresponding factor of correction must remain constant all along this contour 91.

The cam 90 is fixed on any one of the gears 45, 45' and the corresponding transmission is such that one revolution of this cam 90 corresponds to the advance by one step for the chills 20, 20'.

With the contour 91 fo the cam 90 there cooperates a sensor 94 by which the electrical supply of the controlled rotation means 47, which in practice are constituted for example by a simple motor, is controlled.

For example, as shown, the sensor 94 is fixed on the slider 96 of a rotary potentiometer 97, via a transmission 95 introducing a suitable gearing-down, and said potentiometer accordingly pilots, according to the modalities which are within the scope of the man skilled in the art, a variator 98 interposed on the supply of the motor 47.

In operation, the movements of the sensor are proportioned to the desired variations for the advance speed V, and said variations have repercussions on the motor 47.

This speed of advance V is therefore modulated about a mean speed Vm, as desired.

In manner known per se, which will therefore not be described in detail here, this mean speed Vm is itself controlled by a speed regulator sensitive to the rate of flow of the die assembly 10 (not shown in detail in the Figures).

At the outlet of the fixed guide 23, the chills 20, 20' are each in turn taken over by the jacks 50, 50' which are of reciprocating control, and which push them on the rollers 30, 30' in sections Ra, R'a of their path T, T' perpendicularly ot the axis A of the die assembly 10, up to the corresponding plates 33, 33' with balls.

Thus, the successive disengagement of the chills 20, 20' with respect to the tubular section 60 formed is advantageously effected with parallel faces perpendicularly to the axis of this tubular section.

By jacks 48, 48', the chills 20, 20' are displaced on the rollers 30, 30' of the return branch Br, B'r of their path T, T' up to the corresponding plates 33, 33' with balls, and, form there, they are returned to the inlet of the fixed guide 23 by the jacks 49, 49' on the rollers 31, 31' of the section Rr, R'r of said path, at a speed which may advantageously be greater than their speed along the forward branch Ba, B'a of said path.

They may consequently be introduced again, in turn, in the fixed guide 23, by the jacks 51, 51'.

These operations are carried out cyclically and continuously, as the synthetic material involved is extruded.

As will have been noted, the cooling of the latter is advantageously effected in counter-current, the circulation of cooling fluid in the smoothing mandrel 53 being effected from the free end of this smoothing mandrel towards the extrusion die assembly 10.

In addition, according to conventional arrangements, the chills 20, 20' pass, along the rectilinear branch Ba, B'a of their path T, T', beyond the smoothing mandrel 53, into a zone where an intense cooling may be made thereof, by cold air or spraying if necessary, the length of this zone being sufficient for the tubular section 60 to present, on leaving, all the desired rigidity, before the chills 20, 20' move away.

Beyond this zone, the tubular section 60, thus released, may, if desired, as shown schematically in FIG. 1, be taken over by a spout 61 and be directed over a supplementary cooling zone as well as over various conventional treating stations such as sawing, reception, marking, etc.

Of course, for evacuating the air delivered by the extruded material the chills 20, 20' may, in manner known per se, be provided with air evacuation channels and, to this end, may for example be constituted by naturally porous sintered metal (not shown in detail in the Figures).

Any extrudable synthetic material may be used, for example, halogenated polymers, polymers and copolymers of styrene or derivatives thereof, related polyacetals and polymers, polyolefins, and possibly acrylic and metacrylic resins, the corresponding polycarbonates and polymers resisting high temperatures.

Such synthetic materials have a certain, sometimes high, coefficient of thermal expansion, the tubular section 60 formed tends to reduce in section as it is cooled and therefore to tighten on the smoothing mandrel 53.

Consequently, said mandrel is preferably externally truncated, its outer diameter reducing over at least a part of its length, between the punch 12 and its free end.

As specified hereinabove, the apparatus according to the invention enables tubular sections to be obtained having technical characteristics which are superior to those of the conventional smooth tubular sections, the other conditions being otherwise equal.

To illustrate this advantage, a control tubular section T1 will be taken hereinafter, by way of example, with an outer diameter of 400 mm, and having an average wall thickness of 8.4 mm, taking into account the relatively broad tolerances in this domain.

The moment of inertia per cm of length of such a tubular section is equal to 0.040 and its weight per meter for a synthetic material of density 1.42 is 14.600 kg.

Such a tubular section T1 is classed in the 9 000 Kg/m² category according to the French method of approval.

With chills with rib and groove transverse section in the form of a semi-circle having equal radii of 3.5 mm, a tubular section T2 is obtained, according to the invention, for this same category of 9 000 kg/m², having an average thickness of 7 mm, a moment of inertia of 0.041/cm of length, and a weight per meter of 12.100 kg.

A saving of weight of 17.2% is therefore made.

This saving may be further improved if the process of lightening by chemical bubbling, as mentioned hereinabove, is applied to the expanded synthetic material.

The corresponding tubular section T3 thus obtained has a density of 0.85, an average thickness of 9 mm and a weight per meter of 10.500 kg.

The saving in weight is then 28%.

With this chemical bubbling process, the tubular section may either be further lightened and the weight per meter thereof therefore reduced, but moving this tubular section in a lower category of 6000 kg/m² for example, or, on the contrary, the category of this tubular section may be improved by maintaining its density at a noteworthy value.

In the summary Table 1 hereinbelow, in which the various numerical date given hereinabove are collected together, the tubular section T4 corresponds to the first case, and tubular section T5 to the second.

TABLE I

| Tubular section reference | Category kg/m² | Density | Average thickness mm | Moment of inertia per cm | Weight per meter | Weight saving |
|---|---|---|---|---|---|---|
| T₁ | 9 000 | 1.42 | 8.4 | 0.040 | 14.600 | 0 (control) |
| T₂ | 9 000 | 1.42 | 7 | 0.041 | 12.100 | 17.2% |
| T₃ | 9 000 | 0.95 | 9 | 0.089 | 10.510 | 28% |
| T₄ | 6 000 | 0.65 | 9 | 0.089 | 7.190 | 50.8% |
| T₅ | 13 500 | 1.2 | 9 | 0.089 | 13.050 | 7.7% |

Summary Table 2 hereinbelow corresponds to a practical embodiment for which, according to the invention, the radius $R_1$ of the grooves 35 of the chills 20, 20', is smaller than that $R_2$ of the ribs 36 of these chills, the radius $R_1$ in this case being 3 mm and the radius $R_2$ 4 mm, the other conditions being otherwise equal.

In this Table 2, the section $T_1$ is the same control section as before and the sections $T'_2$, $T'_3$, $T'_4$, $T'_5$ which are sections according to the invention, each correspond respectively to the preceding sections $T_2$, $T_3$, $T_4$, $T_5$.

From the foregoing, these sections $T'_2$, $T'_3$, $T'_4$, $T'_5$ according to the invention are characterized in that they have a smooth inner surface and an outer surface provided with annular fins alternating with grooves, and in that their fins and grooves having a circular transverse section, the radius of the transverse section of such a fin is smaller than that of the transverse section of such a groove.

TABLE 2

| Tubular section reference | Category kg/cm² | Density | Average thickness mm | Moment of inertia per cm | Weight per meter | Weight saving |
|---|---|---|---|---|---|---|
| T₁ | 9 000 | 1.42 | 8.4 | 0.040 | 14.600 | 0 (control) |
| T'₂ | 9 000 | 1.42 | 6.2 | 0.041 | 10.750 | 26% |
| T'₃ | 9 000 | 0.95 | 8.0 | 0.089 | 9.360 | 36% |
| T'₄ | 6 000 | 0.65 | 8.0 | 0.089 | 6.400 | 56% |
| T'₅ | 13 500 | 1.2 | 8.0 | 0.089 | 11.820 | 19% |

The characteristics given in these Tables 1 and 2 and particularly those relative to the weight per meter of the tubular sections concerned, were established by calculation and they are confirmed by the practical tests carried out.

A simple comparison of these Tables 1 and 2 will show that, the conditions otherwise being equal, for each section $T'_2$, $T'_3$, $T'_4$; $T'_5$, the saving in weight obtained according to the invention with regard to the control section $T_1$ is greater than that obtained for the section $T_2$, $T_3$, $T_4$, $T_5$ with corresponding equal radii $R_1$, $R_2$.

In practice, it is desirable to maintain in the sections in question a minimum average thickness to avoid a punching thereof, and to have only variations in height compatible with the assembling means usually used for such sections.

Work carried out thus shows that the radius $R_2$ of the ribs 36 of the chills 20, 20' must preferably be larger than the radius $R_1$ of the grooves 36 of these chills only in a proportion between 1.1 and 1.8, and preferably between 1.25 and 1.35.

For a section according to the invention, it is therefore the radius of the grooves which is greater, in the same proportions, than that of the fins.

Figure 6:
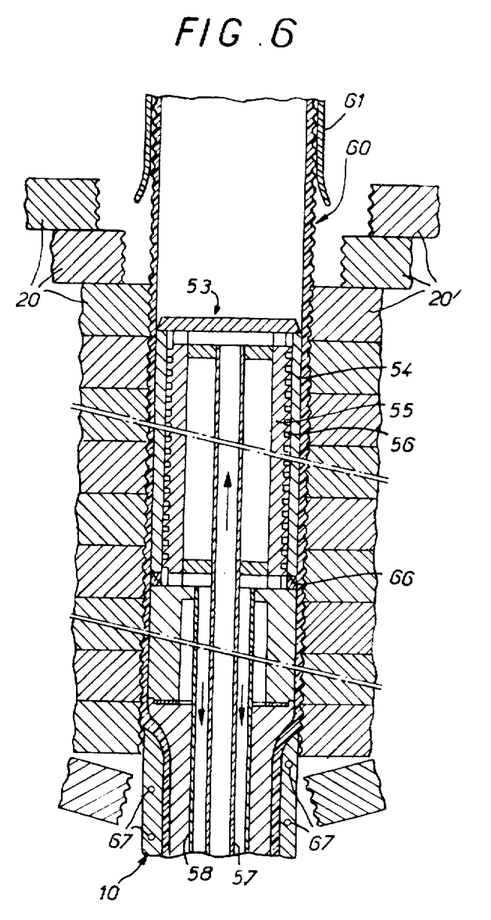
FIG. 6 is a view in axial section similar to that of FIG. 1 for a variant embodiment of the apparatus according to the invention.

According to the variant embodiment shown in FIG. 6, only the end of the smoothing mandrel 53 is cooled and the corresponding tubes 57 and 58 are coaxial.

In addition, in this variant, the chills 20, 20' do not approach the die assembly 10 by parallel faces, i.e. perpendicularly to the axis of this die assembly, as before, but by rotation, the conveying of the chills being ensured by two endless tracks.

Moreover, the present invention is not limited to the embodiments described and shown, but covers all the variants thereto.

The chills 20, 20' may for example be made in three coaxial parts successively fitting in one another, namely an outer frame, an intermediate semi-cylindrical lining and a central semi-cylindrical packing; with such a constitution, only the central packing may be made of bronze, the intermediate lining which allows adaptation thereof to the outer frame, and said frame, both being able to be made of cast aluminum.

Such chills, whether thay are solid or composed of a plurality of parts, advantageously comprise an internal network for the circulation of cooling fluid; for example, such a network may have a supply orifice in the upper part of these chills, and an evacuation orifice in the lower part thereof, a siphon being provided between these two orifices to permanently maintain cooling fluid in these chills and said latter moving perpendicularly to ramps delivering such a cooling fluid thereto, on their advance.

Moreover, such chills are not necessarily all alike, but, on the contrary, certain of them may be different, in order to have a shape which is more apt for a suitable assembly of these chills together.

Finally, the grooves and ribs of these chills do not necessarily extend transversely with respect to the axis of the die assembly 10, and therefore with respect to the chills that they affect; they may, on the contrary, be inclined, or even intersecting, to form any type of embossing on the outer surface of the tubular sections obtained.

In all cases, and as shown schematically by broken lines in FIG. 2, the chills 20 may for example have centering studs 65 projecting therefrom, for engagement in housings provided to this end on the chills 20'.

Concerning the smoothing mandrel 53 and as shown schematically by hatching in FIG. 6, a portion 66 of such a smoothing mandrel is at least locally porous, for passage of cooling fluid, the inner face of this portion 66 being in communication with the channels with which this smoothing mandrel is provided for the circulation of cooling fluid.

Consequently, a part of the cooling fluid circulating in the smoothing mandrel 53 passes radially through said latter and, vaporizing upon contact with the extruded synthetic material, which is hot, it ensures on the one hand a cooling and on the other hand a particularly efficient lubrication of this synthetic material.

Concerning the extrusion die assembly 10, it may conventionally have hot conductors passing therethrough, either electrical conductors or channels in which a heating fluid circulates, as shown schematically in FIG. 6 at 67.

Concerning the conveyer means associated with the chills 20, 20', they may be different from those described hereinabove, and may for example be constituted by endless tracks as mentioned hereinabove.

Concerning more precisely the part of these conveyer means which are associated with the rectilinear branch Br, B'r of the path T, T' of the chills, it may be question of aerial conveyers instead of jacks.

Finally, concerning the fixed guide associated with the rectilinear branch Ba, B'a of the path T, T' of the chills, it may be replaced by any means allowing suitable guiding and holding of these chills for the rectilinear part of their path in question.

What is claimed is:

1. An apparatus for continuous extrusion of tubular sections of thermoplastic material, the tubular section having a smooth inner surface and an annularly finned outer surface, said apparatus comprising a tubular extrusion die assembly having an axis formed by an outer die part and an inner die plunger in combination with two sets of chills each defining a casting cavity position, said chill having grooves of circular cross section alternating with ribs also of circular cross section thereby defining annular fins, conveyer means, for each said set of chills, for continuous displacement thereof along closed loop paths comprising a rectilinear forward branch extending parallel to the axis of said die assembly and on each side of an outlet opening of said die assembly, pairs of chills formed by one said chill from each said set of chills defining successive casting rings, a smoothing mandrel in line with said die plunger of said die assembly, said smoothing mandrel and said chills together defining said casting cavity for the desired tubular section, the improvement wherein the said chills and smoothing mandrel defining a minimum average tubular section wall thickness, and the radius of the circular cross section of said grooves of said chills being substantially smaller than the radius of the circular cross section of the ribs thereby reducing the weight of the resulting tubular section for a given level of mechanical property.

2. An apparatus for continuous extrusion of tubular sections of thermoplastic material, the tubular section having a smooth inner surface and an annularly finned outer surface, said apparatus comprising a tubular extrusion die assembly having an axis formed by an outer die part and an inner die plunger in combination with two sets of chills each defining a casting cavity position, said chill having grooves of circular cross section alternating with ribs also of circular cross section thereby defining annular fins, conveyer means, for each said set of chills, for continuous displacement thereof along closed loop paths comprising a rectilinear forward branch extending parallel to the axis of said die assembly and on each side of an outlet opening of said die assembly, pairs of chills formed by one said chill from each said set of chills defining successive casting rings, a smoothing mandrel in line with said die plunger of said die assembly, said smoothing mandrel and said chills together defining said casting cavity for the desired tubular seciton, the improvement comprising the radius of the circular cross section of said grooves of a said chill being smaller than the radius of the circular cross section of said ribs of the said chill, racks being provided on backs of each said chills, wherein said conveyer means comprise for the rectilinear forward branch of their closed loop paths gears adapted to mesh with said racks of said chills, and controlled rotation means coupled for rotation with said gears for modulating the resultant advance speed of said chills about an average speed thereby compensating for the variable cross section of said casting cavity.

3. An appartus for continuous extrusion of tubular sections of thermoplastic material, the tubular section having a smooth inner surface and an annularly finned outer surface, said apparatus comprising a tubular extrusion die assembly having an axis formed by an outer die part and an inner die plunger in combination with two sets of chills each defining a casting cavity position, said chill having grooves of circular cross section alternating with ribs also of circular cross section thereby defining annular fins, conveyer means, for each said set of chills, for continuous displacement thereof along closed loop paths comprising a rectilinear forward branch extending parallel to the axis of said die assembly and on each side of an outlet opening of said die assembly, pairs of chills formed by one of said chill from each of said sets of chills defining successive casting rings, a smoothing mandrel in line with said die plunger of said die assembly, said smoothing mandrel and said chills together defining said casting cavity for the desired tubular section, the radius of the circular cross section of said grooves of a said chill being smaller than the radius of the circular cross section of said ribs of the said chill, and a fixed guide meshing with said chills in succession.

4. An apparatus for continuous extrusion of tubular sections of thermoplastic material, the tubular section having a smooth inner surface and an annularly finned outer surface, said apparatus comprising a tubular extrusion die assembly having an axis formed by an outer die part and an inner die plunger in combination with two sets of chills each defining a casting cavity position, said chill having grooves of circular cross section alternating with ribs also of circular cross section thereby defining annular fins, conveyer means, for each said set of chills, for continuous displacement thereof along closed loop paths comprising a rectilinear forward branch extending parallel to the axis of aid die assembly and on each side of an outlet opening of said die assembly, pairs of chills formed by one said chill from each said set of chills defining successive casting rings, a smoothing mandrel in line with said die plunger of said die assembly, said smoothing mandrel and said chills together defining said casting cavity for the desired tubular section, the improvement wherein said chills defining a minimum average tubular section wall thickness, and the cross sectional area of said grooves of said chills being substantially smaller than the cross section area of said ribs thereby reducing the weight of the resulting tubular section for a given level of mechanical properties.

5. An apparatus as claimed in claim 1, 3, or 4, said conveyer means providing advance speed modulation about an average speed for compensating for the variable cross section of said casting cavity.

6. An apparatus as claimed in claim 3, said fixed guide comprising at least one rail, wherein each of said chills comprises a longitudinal groove for engagement with said rail.

7. An apparatus as claimed in claim 3, racks being provided on backs of each said chills, said conveyer means comprising for the rectilinear forward branch of their closed loop paths gears adapted to mesh with said racks, of said chills, said gears comprising a drive gear at the incoming end of said fixed guide and further comprising a braking gear at the outlet end of said fixed guide.

8. An apparatus as claimed in claim 1, 2 or 3, means for cooling said smoothing mandrel over at least part of its length comprising channels in said smoothing mandrel for the circulation of cooling fluid therein, wherein at least one portion of said smoothing mandrel is at least locally porous for the flow of cooling fluid, an inner face of said one portion being in communication with said channels for the flow of cooling fluid.

9. An apparatus as claimed in claim 1, 2 or 3, further comprising means for cooling said smoothing mandrel over its terminal part only including channels in said smoothing mandrel for the flow of a cooling fluid therein.

10. An apparatus as claimed in claim 1, 2 or 3, said smoothing mandrel being externally truncated with its outer diameter decreasing over at least the distance of its length between said die plunger and its free end.

11. An apparatus as claimed in claim 1, in which the radius of said circular cross section of said ribs of the said chill ranges from 1.1–1.8 times the radius of the circular cross section of the grooves of the said chill.

12. An apparatus as claimed in claim 1, in which the radius of said circular cross section of said ribs of the said chill ranges from 1.25–1.35 times the radius of the circular cross section of said grooves of the said chill.

* * * * *